United States Patent
Okai et al.

(10) Patent No.: US 7,522,092 B2
(45) Date of Patent: Apr. 21, 2009

(54) RADAR APPARATUS AND RADAR SYSTEM FOR A VEHICLE

(75) Inventors: Fumihiko Okai, Hitachinaka (JP); Hiroshi Kuroda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 82 days.

(21) Appl. No.: 11/655,148

(22) Filed: Jan. 19, 2007

(65) Prior Publication Data
US 2007/0200747 A1    Aug. 30, 2007

(30) Foreign Application Priority Data
Feb. 28, 2006   (JP)   ............... 2006-053040

(51) Int. Cl.
*G01S 13/93* (2006.01)
(52) U.S. Cl. .............. 342/70; 342/59; 342/73; 342/82; 342/159
(58) Field of Classification Search ............ 342/61–72, 342/59, 73, 82–88, 175, 159
See application file for complete search history.

(56) References Cited

U.S. PATENT DOCUMENTS

| | | | |
|---|---|---|---|
| 4,088,955 A | 5/1978 | Baghdady | |
| 4,308,536 A | 12/1981 | Sims, Jr. et al. | |
| 5,280,288 A | 1/1994 | Sherry et al. | |
| 5,497,162 A | 3/1996 | Kaiser | |
| 5,828,333 A | 10/1998 | Richardson et al. | |
| 2002/0003488 A1 | 1/2002 | Levin et al. | |
| 2003/0102997 A1 | 6/2003 | Levin et al. | |
| 2004/0001019 A1* | 1/2004 | Nakazawa et al. | ............ 342/70 |
| 2004/0066323 A1* | 4/2004 | Richter | ....................... 342/70 |
| 2005/0179584 A1 | 8/2005 | Ohlsson | |
| 2006/0109170 A1 | 5/2006 | Volgtlaender et al. | |

FOREIGN PATENT DOCUMENTS

| | | |
|---|---|---|
| JP | 6-160512 A | 6/1994 |
| JP | 8-105963 A | 4/1996 |
| JP | 11-248837 A | 9/1999 |
| WO | WO 98/32028 A1 | 7/1998 |
| WO | WO 2004/048999 A1 | 6/2004 |

OTHER PUBLICATIONS

Partial European Search Report dated Apr. 16, 2007 (six (6) pages).

* cited by examiner

*Primary Examiner*—Thomas H Tarcza
*Assistant Examiner*—Cassi Galt
(74) *Attorney, Agent, or Firm*—Crowell & Moring LLP

(57) ABSTRACT

A radar apparatus including units for transmitting and receiving an electric wave to detect a target, a unit for detecting wave interference caused by surroundings, a unit for controlling the modulation state of the transmitted wave, a communication unit for acquiring modulation state information being used by the other radar apparatuses, and a unit for selecting such a modulation state as to avoid interference with the modulation state information when the wave interference detecting unit detects the wave interference.

9 Claims, 12 Drawing Sheets

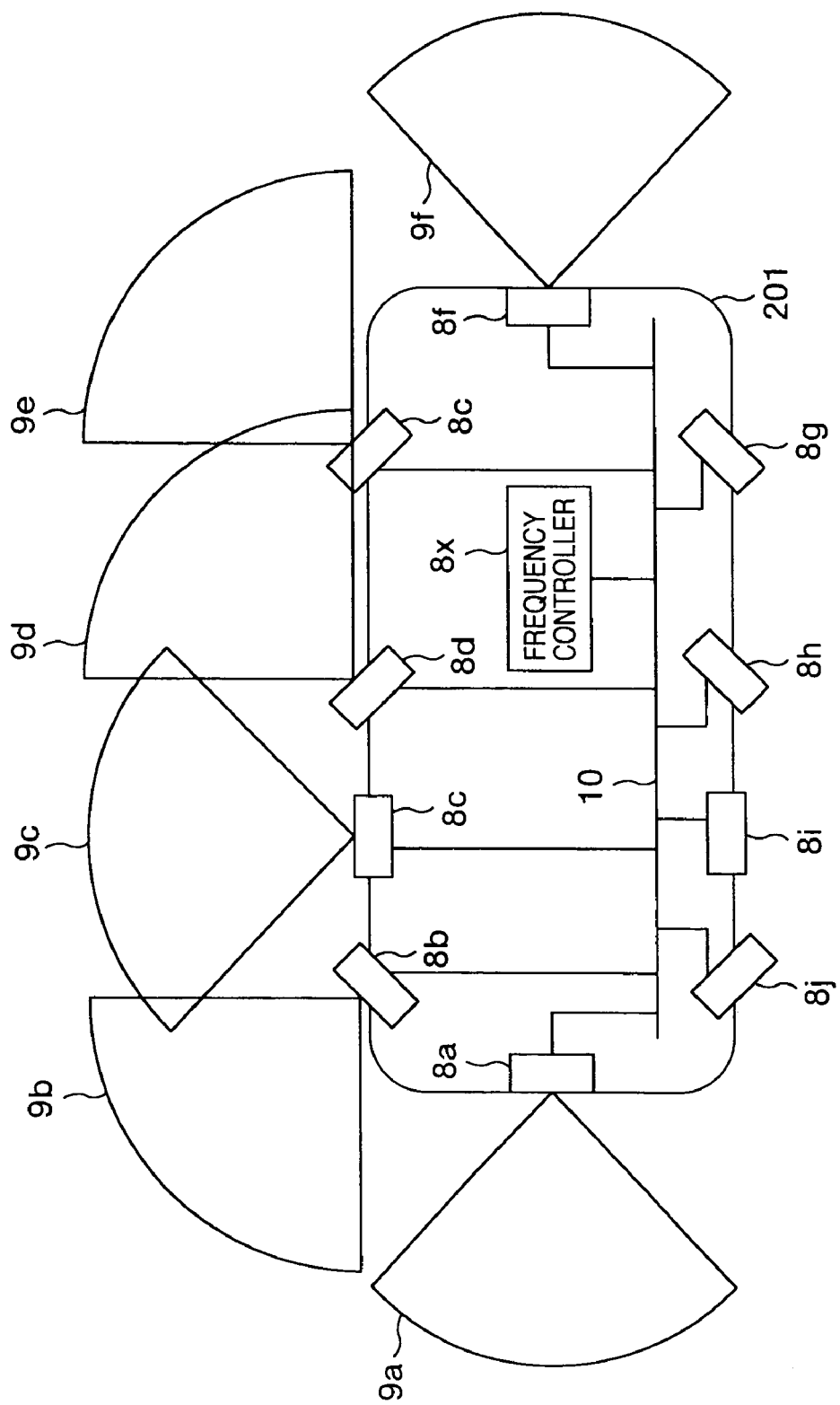

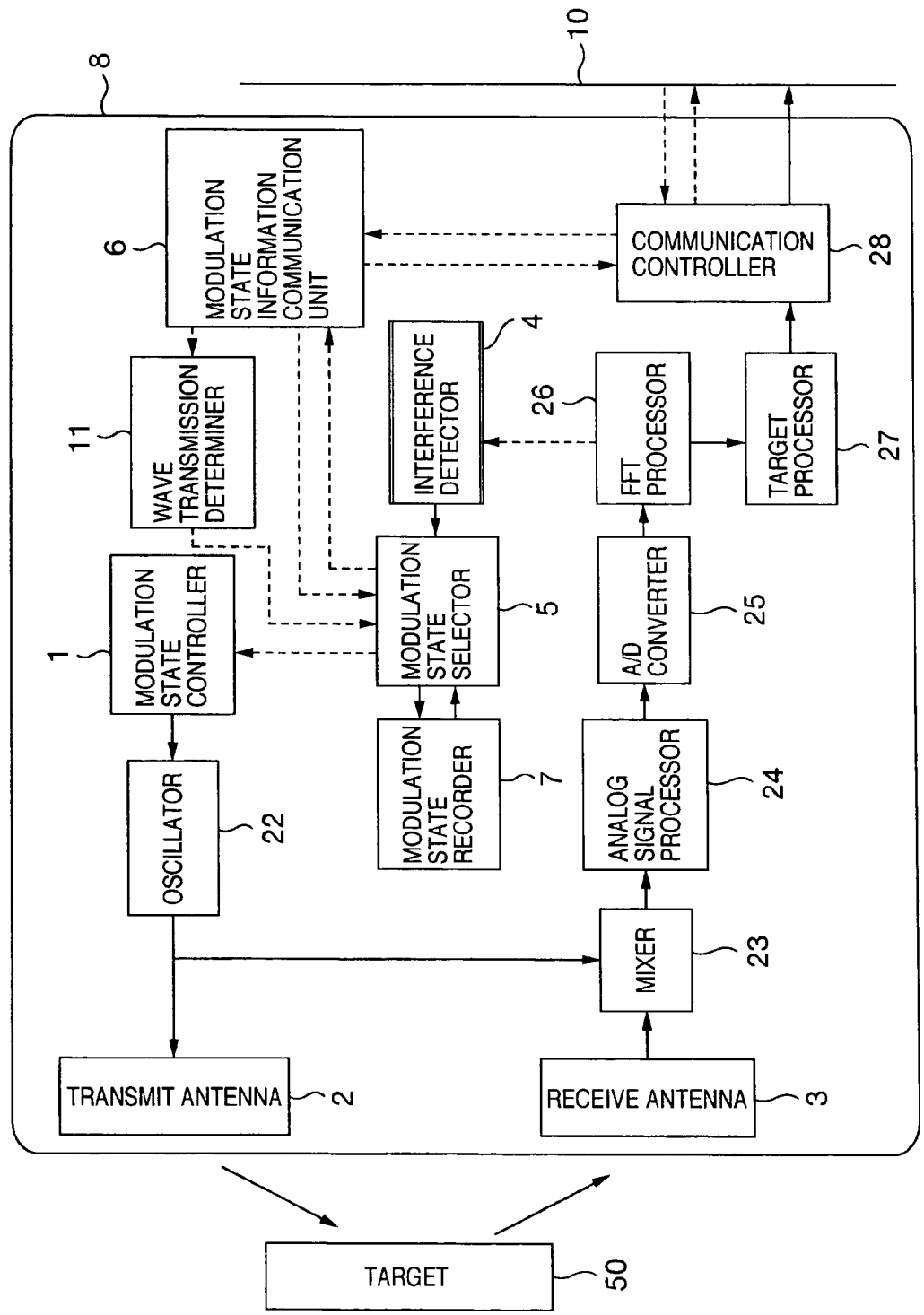

CHANGE THE FREQUENCY IN A PREDETERMINED RANGE UPON INTERFERENCE OCCURRENCE

[INSUFFICIENT MODULATION STATE FLAG OF PROXIMITY RADAR = ON] AND [ONE OF RADAR APPARATUSES TRANSMITTING WAVES AND HAVING LOWEST PRIORITY = SUBJECT RADAR]

[IDLE MODULATION STATE PRESENT] AND [ONE OF RADAR APPARATUSES STOPPING WAVE TRANSMISSION AND HAVING HIGHEST PRIORITY = SUBJECT RADAR]

RADAR APPARATUS AND RADAR SYSTEM FOR A VEHICLE

BACKGROUND OF THE INVENTION

The present invention relates to a system for detecting an obstacle in the vicinity of a vehicle with use of a radio wave radar, and more particularly, to a method for avoiding radio wave interference from its surroundings when the wave interference is detected.

A radio wave radar receives a radio wave reflected when a transmission radio wave is reflected by a target, and detects the target on the basis of the transmission and reception radio waves. Accordingly, when another radio wave radar uses the same frequency as the radio wave radar in question, there may occur, in some cases, a situation that, when receiving a transmission radio wave from the other radar, the radio wave radar in question performs erroneous detecting operation. Such a phenomenon is referred to as wave interference. As a method for coping with the wave interference, there is suggested a method for changing the carrier frequency of a transmission radio wave when wave interference occurs (refer to JP-A-6-160512).

SUMMARY OF THE INVENTION

However, since the prior art method fails to take a situation where a plurality of radar apparatuses are present close to the vehicle into consideration, wave interference takes place and a carrier frequency is changed. As a result, the changed frequency is made to coincide with that of the other radar, which may lead to the fact that wave interference again takes place. And this possibility of such frequency coincidence is considered to be increased as the number of vehicles having a plurality of radar apparatuses increases.

It is an object of the present invention to provide an obstacle detecting system which can change a carrier frequency while avoiding wave interference with another radar when subjected to the wave interference from its surroundings.

In an obstacle detecting system which has a plurality of radio wave radar apparatuses for transmitting and receiving a radio wave to detect a target, the plurality of radar apparatuses share modulation state information about the radar apparatuses through communication, in such a manner that, when the system detects interference, the system selects such a modulation state as not to interfere with the modulation state used by the known other radio wave radar on the basis of the shared modulation state.

In accordance with the present invention, a carrier frequency can be modified without causing any wave interference with the known other radar upon wave interference from surroundings.

Other objects, features and advantages of the invention will become apparent from the following description of the embodiments of the invention taken in conjunction with the accompanying drawings.

BRIEF DESCRIPTION OF THE DRAWINGS

FIGS. 1A and 1B show an arrangement of radar apparatuses in a vehicle radar system in accordance with an embodiment of the present invention and also a block diagram of the system;

DESCRIPTION OF THE EMBODIMENTS

Figure 2:
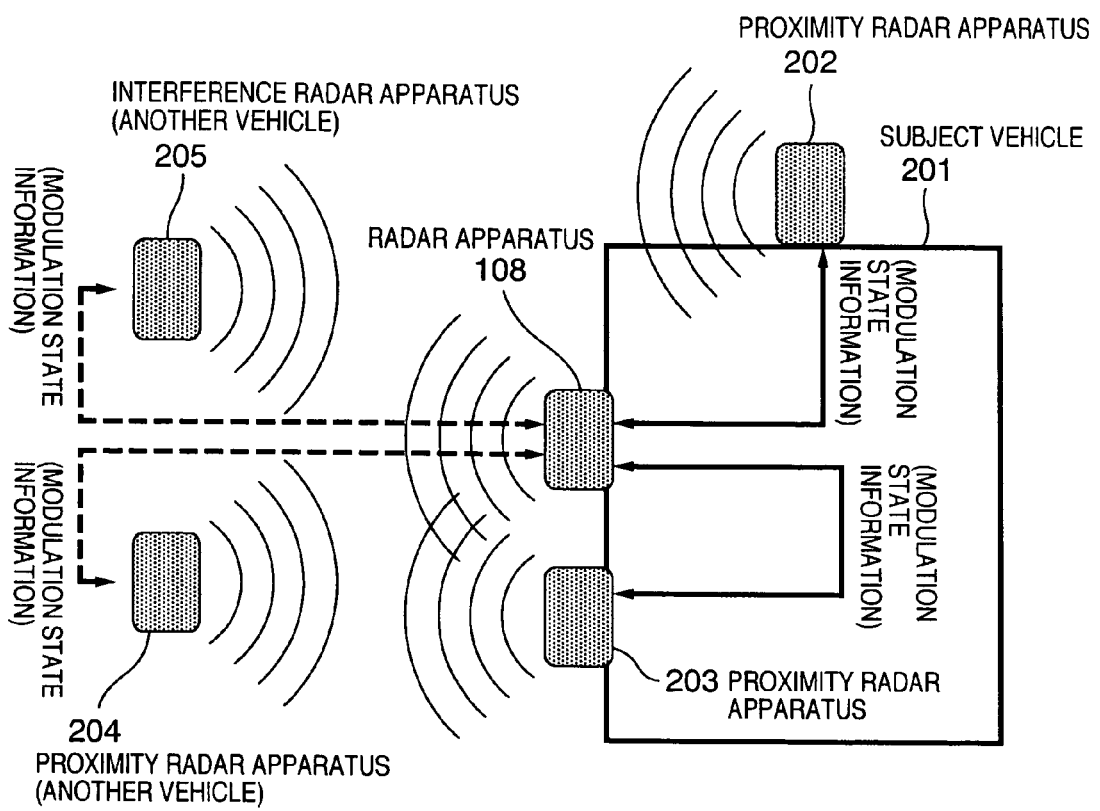
FIG. 2 is a diagram for explaining a relation among a plurality of radar apparatuses.

Embodiments of the present invention will be explained with reference to the accompanying drawings.

Embodiment 1

FIGS. 1A and 2B are diagrams for explaining an obstacle detecting system in accordance with an embodiment of the present invention. More specifically, FIG. 1A shows an example of arrangement of radio wave radar apparatuses mounted on an entire vehicle in the obstacle detecting system. FIG. 1B shows a functional block diagram of each of the radio wave radar apparatuses.

As shown in FIG. 1A, radio wave radar apparatuses 8a to 8j for detecting an obstacle present in each direction (forward, backward, sideways, oblique directions) around a vehicle 201 are mounted on the vehicle. The number of such radio wave radar apparatuses and an arrangement thereof can be suitably selected depending on the contents of vehicle control to be conducted after the obstacle detection. More specifically, for headway distance control or brake control, the radio wave radar is required to be mounted to be directed toward the front of the vehicle. For airbag inflation control upon sideward collision of the vehicle, the radio wave radar apparatus is to required be mounted to be directed toward the side of the vehicle. For passing vehicle alarm or lane changing control, the radio wave radar apparatuses are required to be mounted to be directed toward the rear of the vehicle and in rear-backward directions. According to a combination of controls to be mounted in the vehicle, the number of such radio wave radar apparatuses, an arrangement thereof, and a mounting angle thereof are determined.

When a plurality of radio wave radar apparatuses are mounted in this way, detection areas 9a to 9j of the radar apparatuses are estimated to be partially overlapped with each other. As will be explained later, an obstacle is detected by the radio wave radar apparatuses which transmit radio waves and receive waves reflected by the obstacle. Thus, when the detection areas of the plurality of radio wave radar apparatuses using the same frequency are overlapped with each other, one radio wave radar may receive the wave transmitted from the other radio wave radar, thus producing an inaccurate detection result. In order to avoid such a situation, the radio wave radar apparatuses 8a to 8j of the present embodiment are arranged so that at least adjacent two of the radio wave radar apparatuses have different frequencies. With such an arrangement, when the plurality of radio wave radar apparatuses are mounted on the vehicle, the radar apparatuses can detect an obstacle around the vehicle according to the purpose.

Meanwhile, as has been shown also in the prior art, when there are a plurality of vehicles each of which have a plurality of radio wave radar apparatuses, the subject vehicle may receive a wave transmitted from another vehicle, thus causing wave interference. In such a case, the prior art is arranged to solve the wave interference by changing the frequency of the transmit signal of the vehicle when receiving the interference. When a plurality of radio wave radar apparatuses are mounted on a single vehicle as in the present embodiment, however, the changed frequency may interfere with the frequency being used by the other radio wave radar mounted on the subject vehicle. To avoid such a situation, in the present embodiment, the radio wave radar apparatuses 8a to 8j are connected to a communication line 10 to send frequency information being used by the respective radar apparatuses to the other different radar apparatuses. As a result, the frequency information being used by the radar apparatuses can be shared, and thus the carrier frequency can be changed to a frequency different from the frequencies being used by the other radar apparatuses. In this connection, the use frequencies of the radar apparatuses can be managed under control of a frequency controller 8x provided as shown in FIG. 1A. However, the use frequency control system may be arranged so that the radar apparatuses transmit, receive, store their use frequencies, and autonomously avoid interference with the radar apparatuses of the subject vehicle. When consideration is paid to the simplification of the obstacle detecting system and application to different types of vehicles, the latter is desirable because it can flexibly cope with the radar arrangement change or addition.

FIG. 1B is a functional block diagram of each of the radio wave radar apparatuses 8a to 8j. An oscillator 22 oscillates a wave according to a carrier frequency determined by a modulation state (or modulation mode) controller 1. The transmit wave is radiated from a transmit antenna 2. The radiated wave is reflected by a target 50 as a detection object and is received by a receive antenna 3. The received wave is input to a mixer 23, which in turn calculates an intermediate frequency signal as a difference from the transmitted wave. Since a Doppler shift causes by the position of the target 50 or by the relative velocity to the radar apparatus 8 takes place in the received signal, a signal indicative of the position of the target or the relative velocity can be extracted by finding the intermediate frequency signal. The calculated intermediate frequency signal in input to an analog-to-digital converter (A/D converter) 25 via an analog signal processor 24 for gain adjustment or the like. The intermediate frequency signal converted to a digital signal by the A/D converter 25 is subjected to FFT (Fast Fourier Transform) by an FFT processor 26 to extract a peak (frequency) indicative of the target 50. In this manner, the electric wave type radar apparatus detects the target. In this connection, the radar apparatus 8 may employ one of various modulation systems such as FMCW or 2-frequency CW, and the modulation state controller 1 may change the frequency of the transmit wave with time according to a predetermined modulation system. More specifically, the frequency of the transmit wave is changed along a triangular wave shape, or switches between two slightly-different frequencies on a time division basis. A physical meaning indicative of the Doppler frequency becomes a distance from the target or a relative velocity depending on employed one of the above modulation systems. Thus the modulation system is selected according to the use application of the radar apparatus 8.

A frequency ban usable by electric wave radar apparatuses for vehicle is assigned under the law in each country. Accordingly, in order to avoid interference, it is required to change the frequency in a range or limitation determined by the law. The limitation is a relatively narrow range such as 76 GHz, 60 GHz, or 24 GHz. Since modulation such as FMCW (triangular wave) or 2-frequency CW (2-frequency time division) as mentioned above is carried out in the radio wave radar, the use frequency is required not to be a single frequency but to have a width changeable vertically from a specified center frequency. For this reason, when a plurality of radar apparatuses are mounted on each of a multiplicity of vehicles, use frequencies sufficient to prevent interference cannot be prepared, and the limited number of use frequencies are required to be used flexibly and effectively. To this end, the present embodiment has an arrangement which follows.

Figure 8:
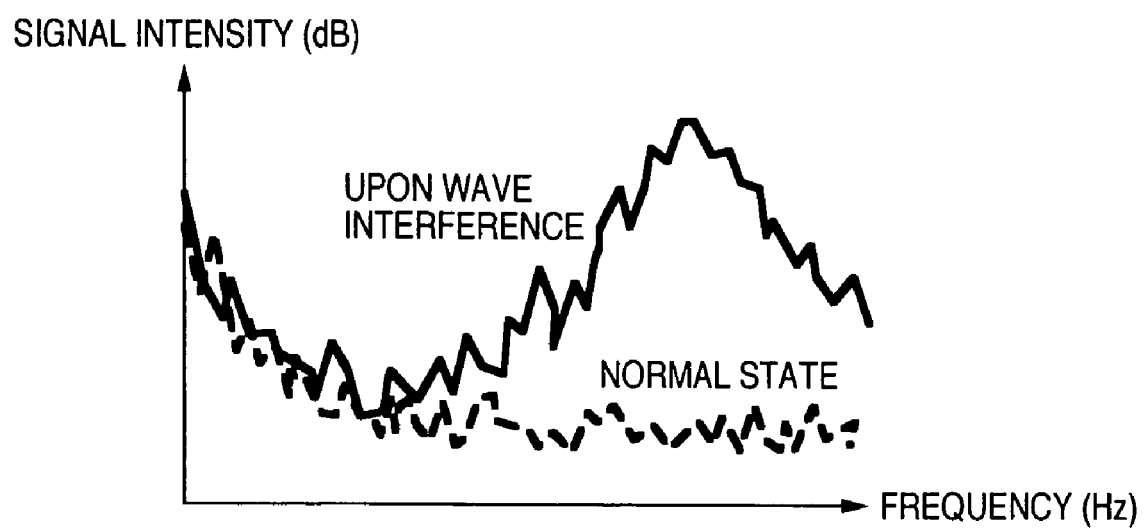
FIG. 8 shows an example 1 of a means for detecting wave interference.

A plurality of set values of carrier frequencies usable by the radar apparatus are recorded in a modulation state recorder 7, and a modulation state selector 5 randomly selects one of the recorded carrier frequencies. The modulation state controller 1 generates such a modulation signal as to cause the current carrier frequency to be changed to the selected carrier frequency. A wave is radiated from the transmit antenna 2 according to the modulation signal. A reflected wave from the target is received at the receive antenna 3, and an interference detector 4 determines whether or not the received wave is interfered. As the interference detecting method, the received signal is FFT analyzed to check an increase in waveform with respect to a normal level and to determine the interference occurrence as shown in FIG. 8.

Figure 7:
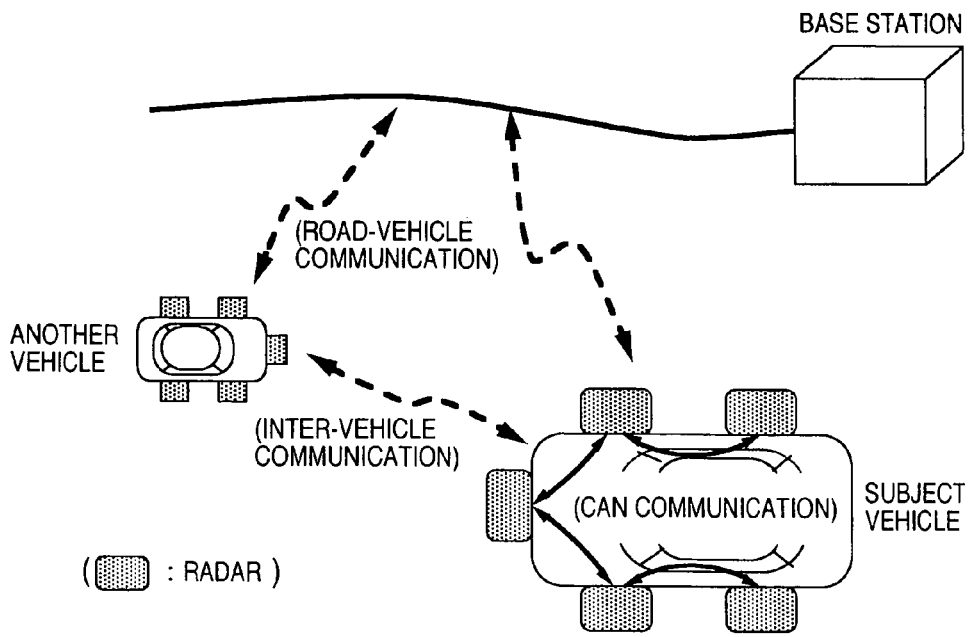
FIG. 7 is a diagram for explaining an example of communication.

Meanwhile, a modulation state information communication unit 6 outputs the selected carrier frequency value to the other radar apparatuses or receives the carrier frequency values selected by the other radar apparatuses. FIG. 7 shows a communication means which has been generally used. However, communication between radar apparatuses in the same vehicle can be carried out by CAN (Controller Area Network) communication, and communication other than the communication within the same vehicle can be carried out by inter-vehicle communication or by road-vehicle communication.

Thus, when consideration is paid to the fact that a plurality of radar apparatuses are present in a proximity area in close proximity to the subject vehicle as shown in FIG. 2, the modulation state information communication unit 6 can share information on the modulation state information of the radar apparatuses. The word "proximity area" used herein refers to such an area that transmit waves emitted or transmitted from the radar apparatuses can reach. In the case of a car-mounted radar apparatus, the proximity area has a distance between 0 and 200 m.

Assume now that an electric wave transmitted from an interference radar 9 causes wave interference with the radar apparatus 8. Then since the interference detector 4 detects the wave interference, the modulation state selector 5 again select a new carrier frequency. At this time, the selection is carried out by randomly selecting one of the set values of the carrier frequencies recorded in the modulation state recorder 7 other than the carrier frequencies of the other radar apparatuses.

The modulation state controller 1 is controlled according to the newly-selected carrier frequency.

Figure 3:
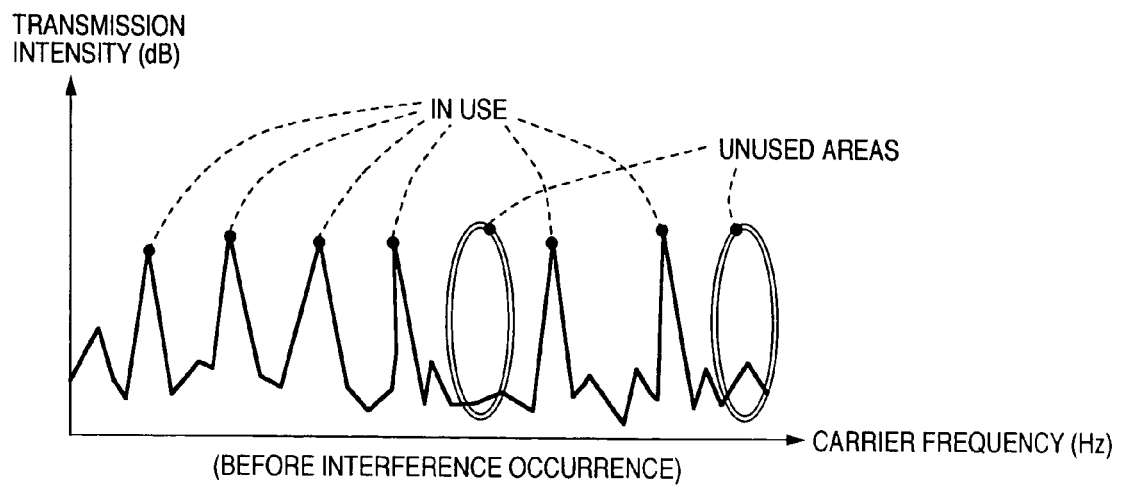
FIG. 3 is a diagram for explaining how frequency is used before interference occurrence.
Figure 4:
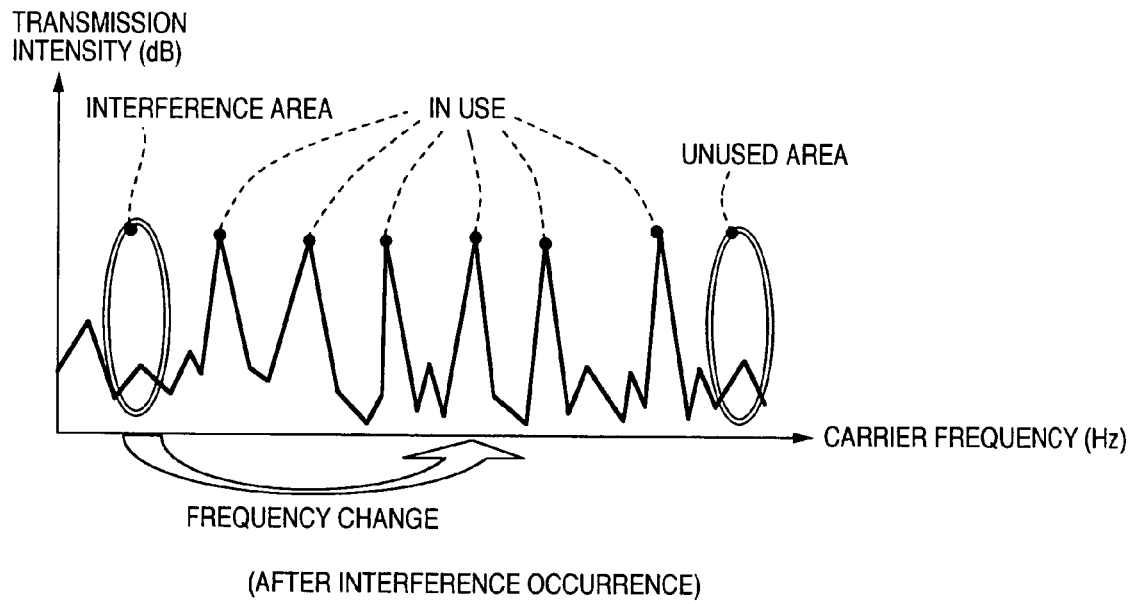
FIG. 4 is a diagram for explaining how frequency is used after the interference occurrence.

Explanation will next be made as to the contents of the operation when wave interference takes place, by referring to a spectrum chart. FIG. 3 shows a frequency use state before interference takes place in the six radar apparatuses, and six peaks indicates the use frequencies of the radar apparatuses. Two areas surrounded each by double-line ellipse indicates a frequency band not used by any of the radar apparatuses. Now consider a case where wave interference takes place in a left-end peak as shown in FIG. 4. In order to avoid the interference, the carrier frequency of the interfered peak is changed. In this case, a frequency not used by the other radar apparatuses is selected as a new carrier frequency to be changed. Through such operation, wave interference with the other radar apparatuses can be prevented from again taking place after the frequency is changed.

Figure 9:
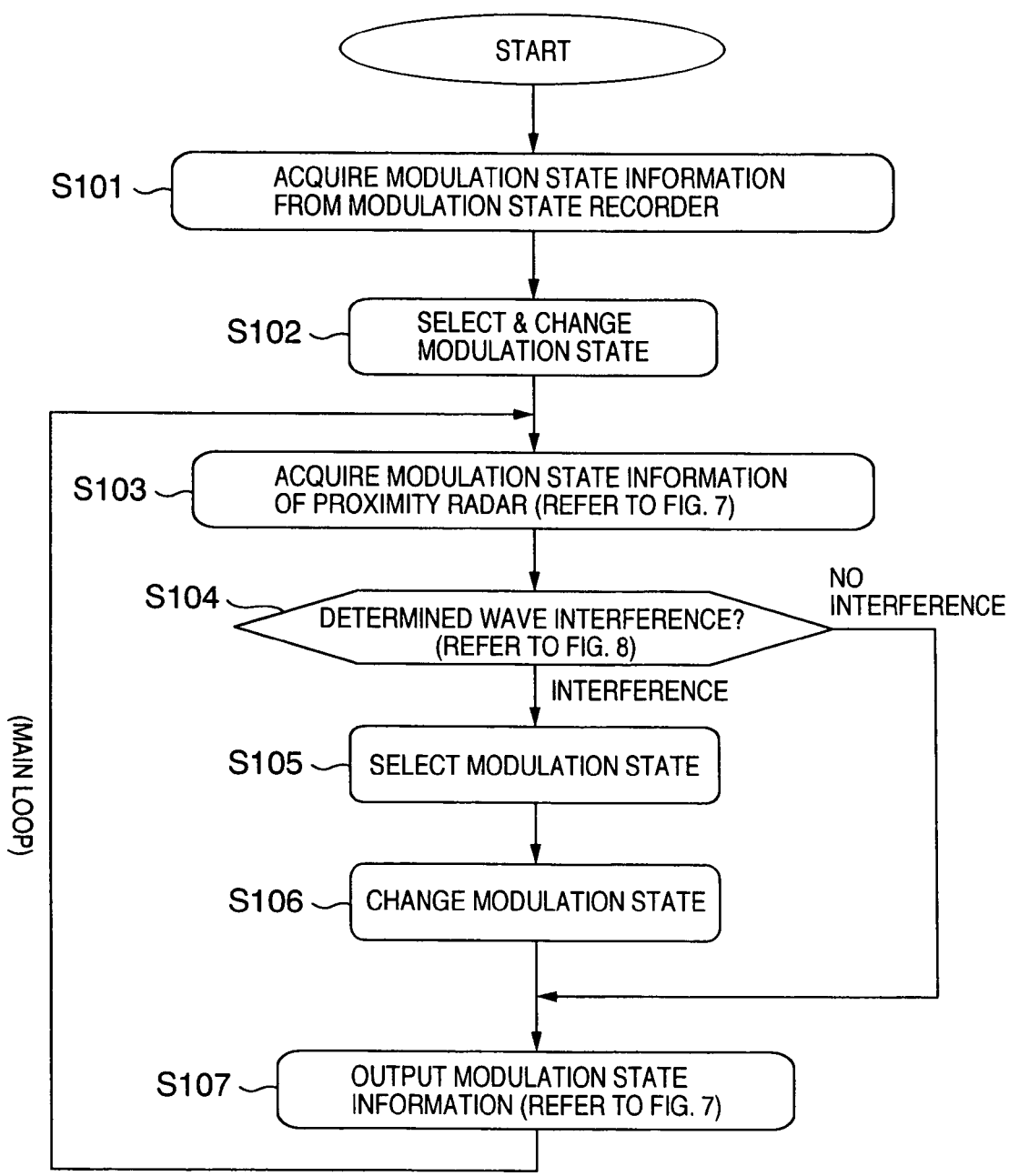
FIG. 9 is a main flow chart for explaining the operation of the present invention.

The operation of the present invention mentioned above is summarized as a flow chart shown in FIG. 9. The apparatus first acquires the set values of carrier frequencies from the modulation state recorder 7 (step S101), and selects only one of the carrier frequencies. The apparatus starts transmitting an electric wave with the selected carrier frequency (step S102). The apparatus then acquires modulation state information about a radar apparatus present in the proximity area (step S103). The apparatus also determines whether or not wave interference takes place on the basis of signal processing and analysis (step S104). In the absence of the occurrence of the wave interference, the apparatus proceeds to a step S107. In the presence of the wave interference, the apparatus executes the operation of a step S105. In the step S105, the apparatus randomly selects only one of the set values of the carrier frequencies acquired at the step S101 and other than the carrier frequency of the radar apparatus in the proximity area acquired at the step S103. And the apparatus changes the actual current carrier frequency to the selected carrier frequency (step S106), and externally (outside of the radar apparatus) outputs the set value of the selected carrier frequency at the step S107. The operations of the steps S103 to S107 are repeated during the operation of the radar apparatuses.

Figure 15A:
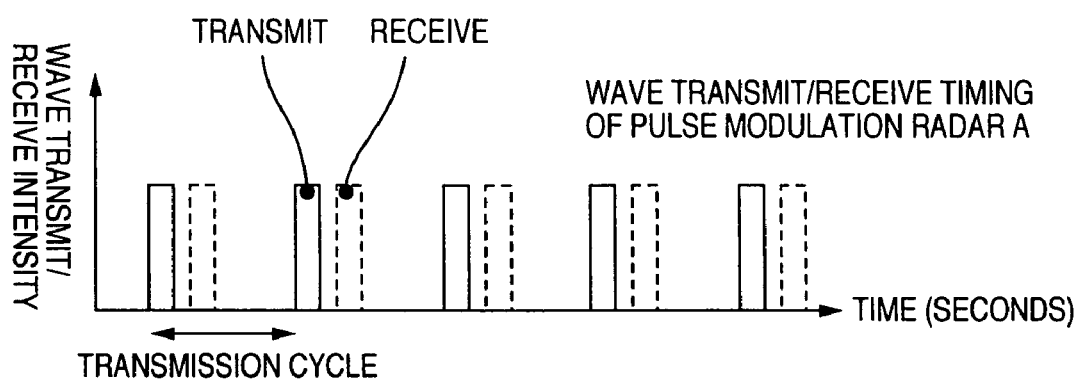
FIGS. 15A and 15B are timing charts for explaining a wave transmission/reception cycle of a pulse modulation radar apparatus.
Figure 15B:
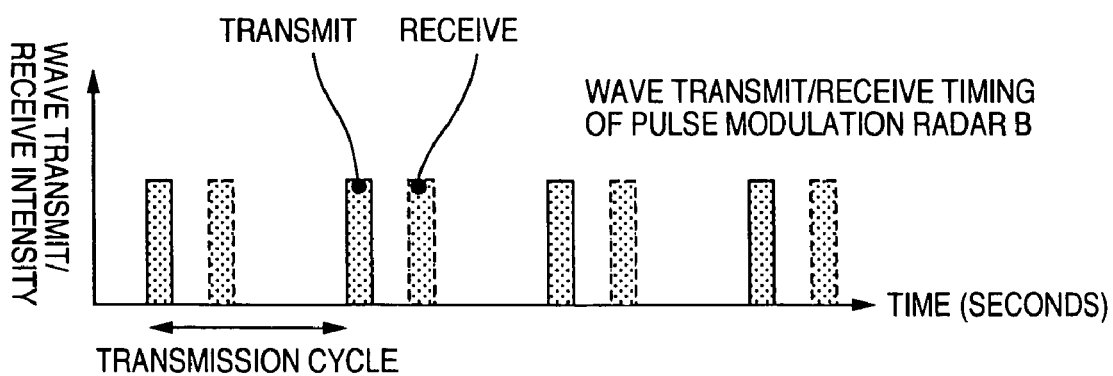

Although the carrier frequency has been used as the modulation state (or modulation mode) in the present embodiment, the carrier frequency may be replaced with one or more of the modulation type of transmit wave, the orientation of polarization plane of the wave, a transmission cycle, and a modulation code. Even in this case, effects similar to the above apparatus can be obtained. For example, when the polarization plane orientation is used as the modulation state, the angle of the polarization plane is used as the modulation state information. And by providing different angles of the polarization plane for the respective radar apparatuses, wave interference can be prevented. In this connection, in order to control the angle, a device for rotating the polarization plane can be employed as shown in JP-A-11-248837. When the transmission cycle is employed as the modulation state, a transmission cycle time in pulse modulation is used as the modulation information. When two pulse-modulation radar apparatuses A and B have different transmission cycles as shown in FIGS. 15A and 15B, the timing of transmit wave of one of the radar apparatuses is shifted from the timing of transmit wave of the other party radar apparatus upon every wave reception. Thus wave interference can be avoided by the above time filter. When the modulation code is used as the modulation state, a modulation/demodulation code in the spread spectrum system is used as the modulation state information. By changing the pattern of the code, wave interference can be avoided.

In FIG. 2, further, the modulation states of the radar apparatuses different by an angle of 90 degrees or more in mounting direction may have the same value at the same time. In this case, the limited frequency source can be efficiently utilized.

Figure 11:
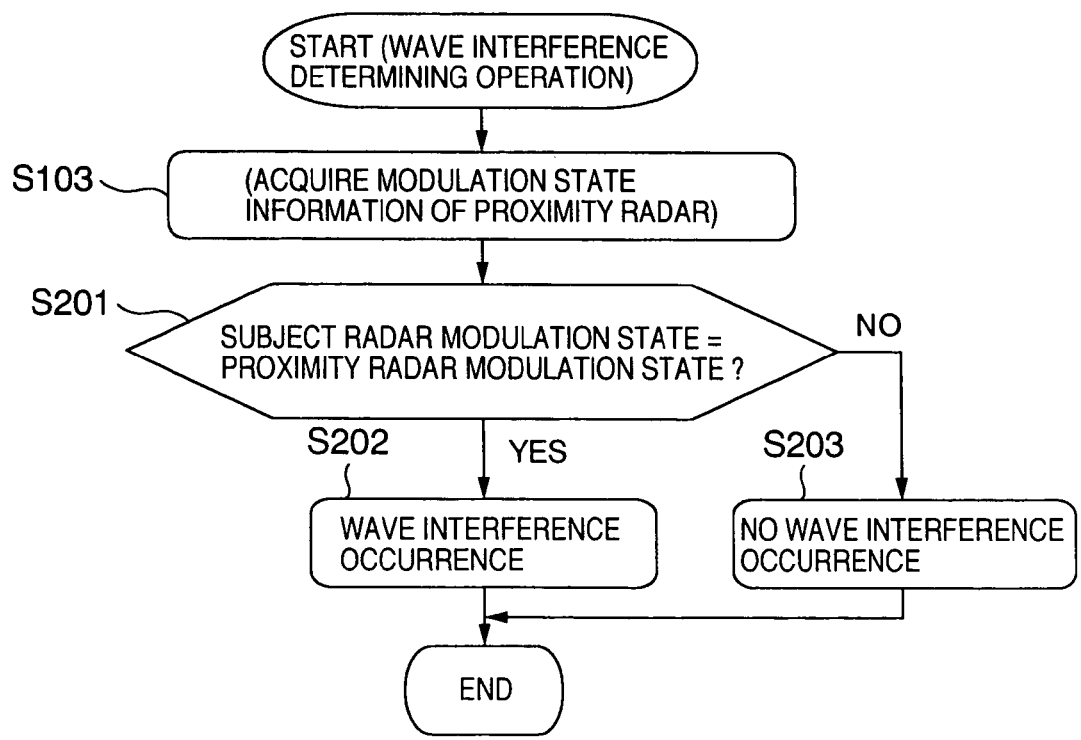
FIG. 11 is an example 2 of the unit for detecting wave interference.

The device for detecting wave interference may estimate the occurrence of wave interference by collating with the modulation state information of the other radar apparatus acquired through communication. In other words, as shown by a flow chart in FIG. 11, the apparatus first acquires modulation state information on the proximity radar apparatus (step S103), and determines whether or not the acquired modulation state information coincides with the modulation state information on the subject radar apparatus (step S201). When finding a coincidence therebetween, the apparatus determines the occurrence of wave interference (step S202). Otherwise, the apparatus determines no occurrence of wave interference (step S203). In this manner, the apparatus can previously detect wave interference before the wave interference actually takes place.

Another arrangement of sequentially adding priority identification codes for the respective radar apparatuses in the modulation state information may be possible. In this case, upon the occurrence of wave interference, the apparatus controllably turns ON/OFF the modulation state according to the priority. More specifically, the modulation state of only one of the two radar apparatuses subjected to the wave interference and having the low priority is modified, whereas, the modulation state of the other radar apparatus having the high priority is not modified and used as it is.

Figure 12:
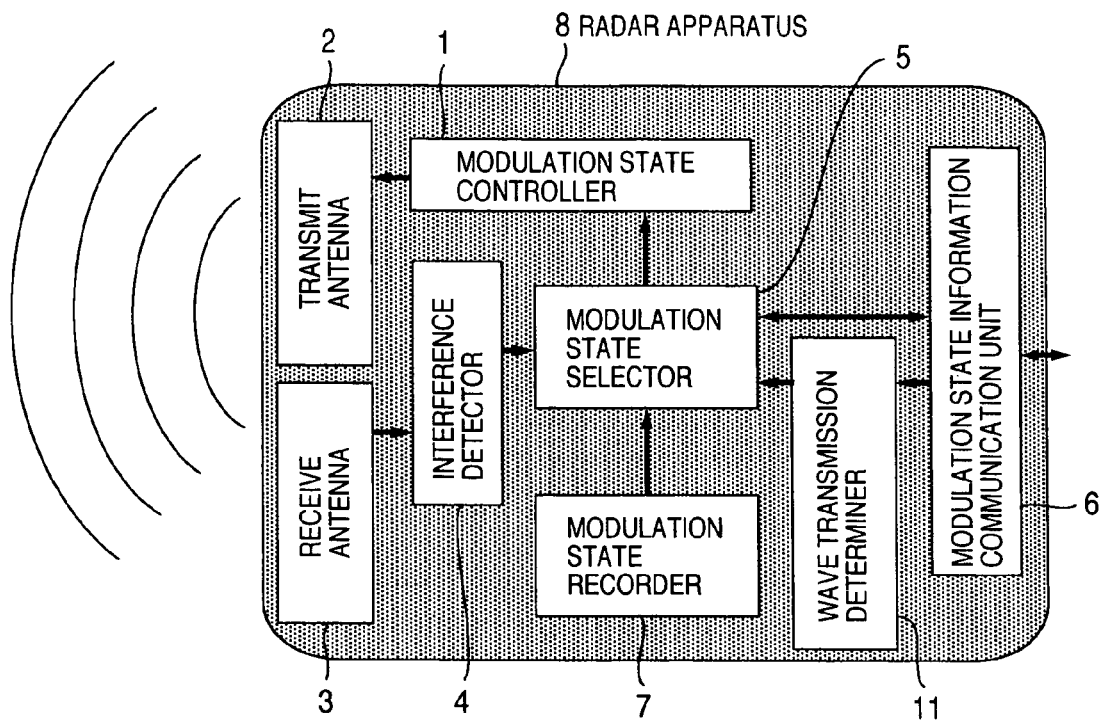
FIG. 12 is a block diagram of a radar apparatus for controlling turning ON/OFF of wave transmission.
Figure 13:
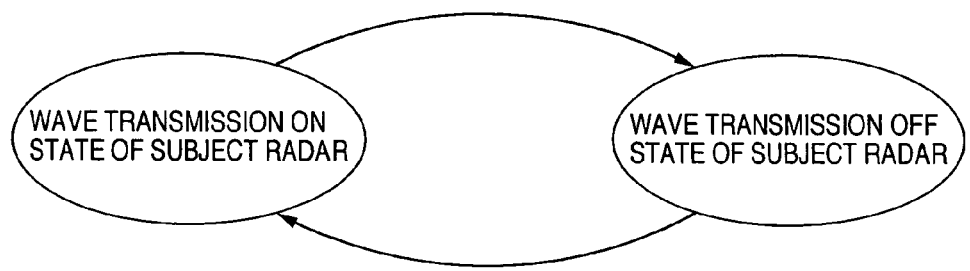
FIG. 13 shows a status transition diagram of a wave transmission determining unit.
Figure 14:
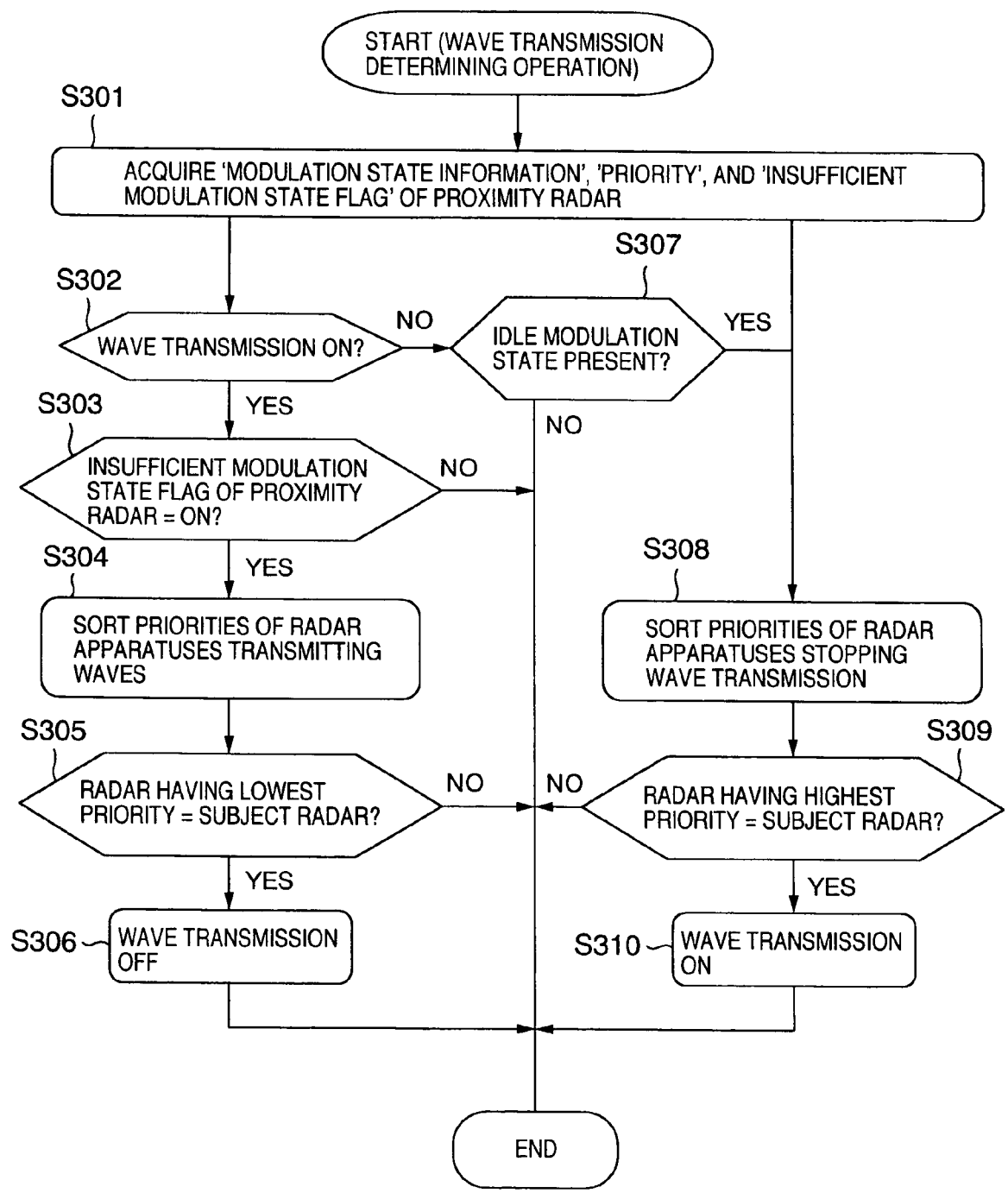
FIG. 14 is a flow chart for explaining the operation of the wave transmission determining unit.

When the usable frequency source becomes insufficient due to an increased number of radar apparatuses, the function of the radar apparatus having the low priority may be stopped. The function stop decision can be implemented by a wave transmission determiner 11 provided in the apparatus as shown in FIG. 12. The operational contents of the wave transmission determiner will be explained by referring to FIG. 13. Consider first a case where the wave transmission state of the subject radar apparatus is ON. At this time, when receiving a message indicative of an insufficient modulation state from the proximity radar apparatus through external communication, the apparatus sorts the radar apparatuses emitting their waves according to the priority. When the radar apparatus having the lowest priority is the subject radar apparatus as the sorted result, the apparatus transits the wave transmission state of the subject radar apparatus to OFF, and informs the modulation state selector 5 of the fact. The modulation state selector 5 in turn selects the stoppage of the wave transmission on the basis of the notification. When the wave transmission state is OFF, on the other hand, the apparatus determines the presence of absence of a usable or idle modulation state with use of the modulation state information of the proximity radar apparatus acquired through the external communication. In the presence of an idle modulation state, the subject radar apparatus sorts the radar apparatuses stopping the wave transmission according to the priority. When the radar apparatus having the highest priority is the subject radar apparatus, the subject apparatus transit the wave transmission state to ON to cause the modulation state selector 5 to select the resumption of the wave transmission. Such processing operations are shown by a flow chart in FIG. 14. The apparatus first acquires modulation state information on the proximity radar apparatus, a priority, and an insufficient modulation state flag at a step S301. When the wave transmission state of the subject radar apparatus is ON (step S302), the apparatus determines whether or not the insufficient modulation state flag of the proximity radar apparatus received through the external communication is ON (step S303).

When the flag is ON, the apparatus sorts the radar apparatuses during wave transmission according to the priority (step S304). The apparatus determines whether or not the radar apparatus having the lowest priority is the subject radar apparatus on the basis of the sorted result (step S305). Otherwise, the apparatus turns OFF the wave transmission (step S306). At a step S307, on the other hand, the apparatus determines the presence or absence of an idle modulation state with use of the modulation state information of the proximity radar apparatus received through the external communication. In the presence of an idle modulation state, the apparatus sorts the radar apparatuses currently stopping the wave transmission according to the priority (step S308). The apparatus determines whether or not the radar apparatus having the highest priority is the subject radar apparatus on the basis of the sorted result (S309). If so, then the apparatus sets the wave transmission at ON (step S310) and resumes the wave transmission. According to the above method, the radar apparatus having the higher priority can operate until the last.

One or more of the wave interference detector, the modulation state communication unit, and the modulation state selector may be provided outside the radar apparatus. In this case, the function or functions of the above device or devices can be operated to be shared by the plurality of radar apparatuses.

The modulation state may be selected according to localities by road-vehicle communication or by car navigation. In this case, since the modulation state is switched for each vehicle running area, the modulation state can also be divided, for example, according to running lanes.

Embodiment 2

Figure 10:
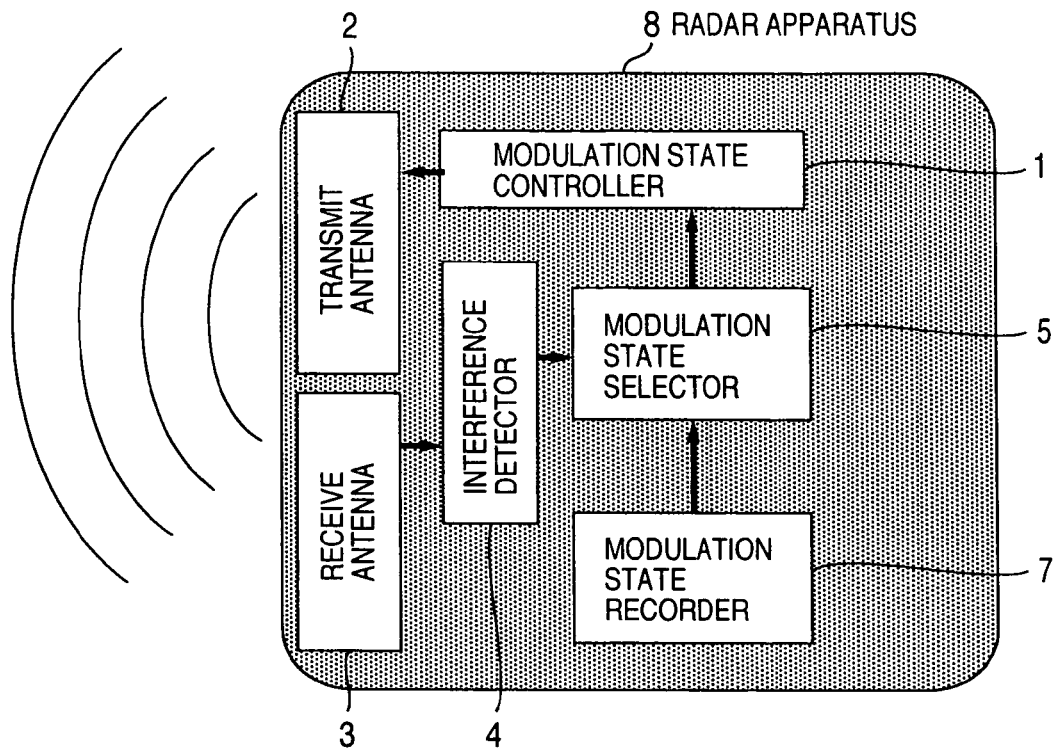
FIG. 10 is a block diagram for explaining another embodiment of the present invention.

FIG. 10 is a block diagram of a radar apparatus for embodying another embodiment of the present invention. Constituent elements not specifically explained are assumed to be similar to those in FIG. 1 and to have functions similar thereto.

A set range of carrier frequencies usable by the radar apparatus are previously recorded in the modulation state recorder 7. Only one of carrier frequencies in the range is randomly selected by the modulation state selector 5. The set range is set so as to become different for different radar apparatuses. The modulation state controller 1 generates a modulation signal so as to cause the current carrier frequency to be changed to the selected carrier frequency, and an electric wave is radiated from the transmit antenna 2 according to the modulation signal. A reflected wave from a target is received at the receive antenna 3, and the interference detector 4 determines the presence or absence of wave interference on the basis of the received wave. The detection of wave interference is carried out by FFT analyzing the received signal and checking an increase in the waveform with respect to the normal level as shown in FIG. 8.

When the interference detector 4 detects the wave interference, the modulation state selector 5 again selects a new carrier frequency. As mentioned above, the selection is carried out by randomly selecting one of the carrier frequencies in the set range recorded in the modulation state recorder 7. And the modulation state controller 1 is controlled according to the newly-selected carrier frequency.

Figure 5:
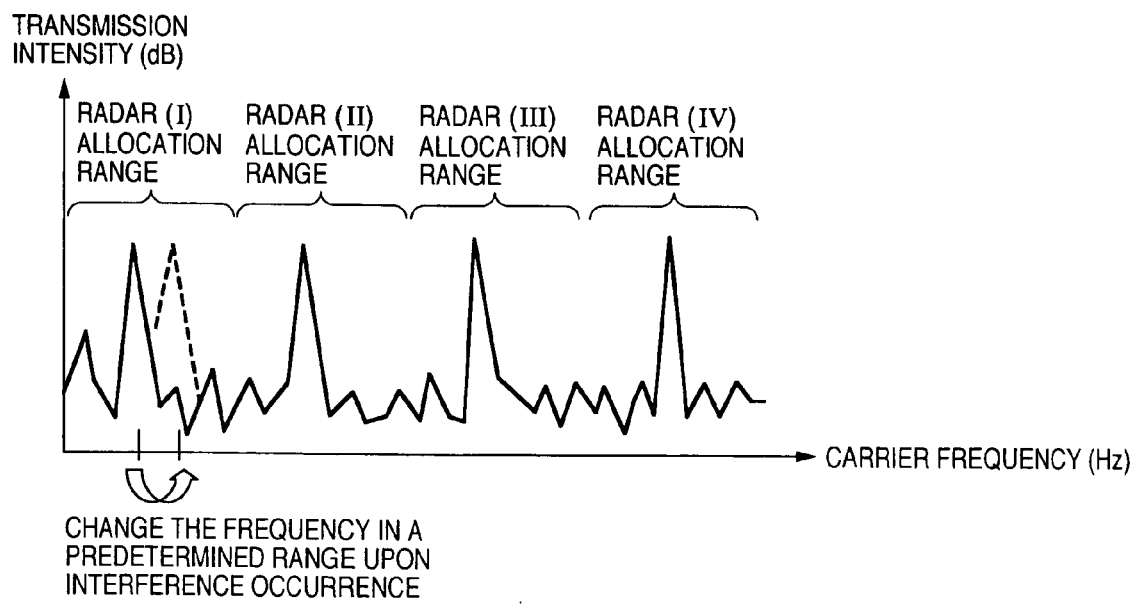
FIG. 5 shows an example 1 of setting frequency allocation.

How to avoid the occurrence of the wave interference will be explained by using a spectrum chart. FIG. 5 shows set ranges of carrier frequencies allocated to respective radar apparatuses I to IV. When wave interference takes place in the radar apparatus I, the apparatus shifts the current carrier frequency to another one of carrier frequencies in the set range allocated to the radar apparatus I. In this case, the different carrier frequency ranges are previously allocated to the different radar apparatuses. Thus even when the carrier frequency is changed, this will not cause wave interference to take place in the other radar apparatuses.

Figure 6:
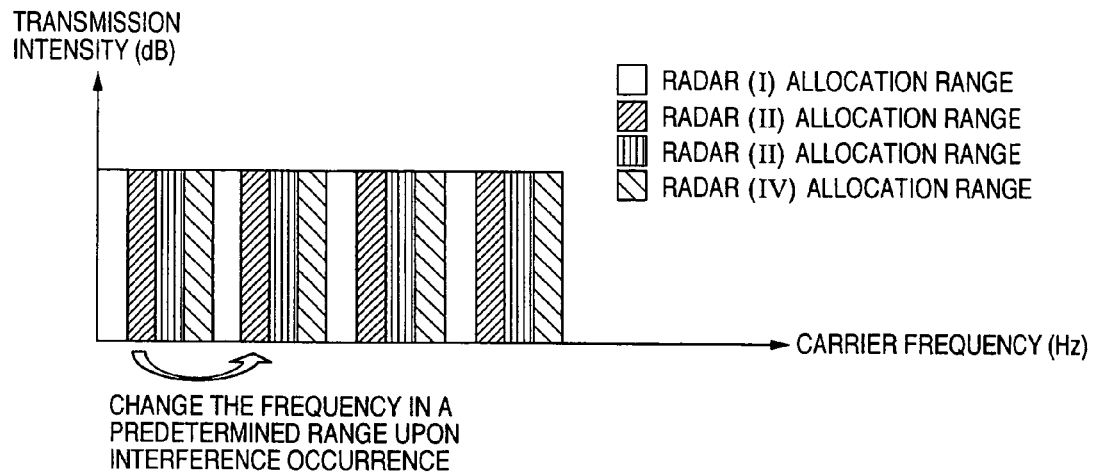
FIG. 6 shows an example 2 of setting the frequency allocation.

Further, the carrier frequency range may be allocated in the form of a comb or discretely as shown in FIG. 6. In this case, the frequency is calculated in accordance with an equation which follows. In the equation, A denotes the number of radar apparatuses mounted on the subject vehicle, B denotes a parameter (0 to (A−1)) allocated to each radar, and n denotes a variable number (between 0 and N, whose upper limit is N).

$$\text{Carrier frequency range [Hz]} = A \times n + B$$

In the present embodiment, the carrier frequency has been used as the modulation state. However, one or more of the modulation type of transmit wave, the orientation of polarization plane of the wave, a transmission cycle, and modulation code may be used as the modulation state. Even in this case, effects similar to those in the above embodiment can be obtained.

With respect to the set range of the carrier frequency, a broader range may be allocated to the radar apparatus having a higher priority.

In addition, the modulation state may be selected according to localities under control of the road-vehicle communication or under control of the car navigation. In this case, since the modulation state is switched for each vehicle running area, the modulation state can also be divided, e.g., according to running lanes.

Preferable embodiments of the present invention will be explained below.

The radar apparatus of the present invention comprises a unit for transmitting and receiving an electric wave to detect the presence or absence of a target, a unit for detecting wave interference caused by surroundings, and a unit for controlling the modulation state of the transmitted wave. The radar apparatus further comprises a communication unit for acquiring modulation state information being used by the other radar apparatuses, and a unit for selecting such a modulation state as to avoid interference with the modulation state information when the wave interference detecting unit detects the wave interference. As a result, the modulation state information of the other radar apparatuses are shared so that, when subjected to wave interference and changing the carrier frequency or the like, the radar apparatus can be prevented from being again subjected to wave interference by the other radar apparatuses.

A radar system for a vehicle has a plurality of radar apparatuses mounted on the vehicle. Each of the radar apparatuses comprises a unit for transmitting and receiving an electric wave to detect the presence or absence of a target, a unit for detecting wave interference caused by surroundings, and a unit for controlling a modulation state of the transmitted wave. The system further comprises a unit for allocating different modulation state ranges to the respective radar apparatuses, and a unit, when the wave interference detecting unit detects the wave interference, for selecting one of modulation states in the range of the transmitted wave to avoid the interference. As a result, the system is intended to prevent wave interference without sharing the modulation state information of the radar apparatuses.

With the aforementioned arrangement, when the radar apparatuses mounted to be mutually different in mounting direction by an angle of 90 degrees or more uses the same modulation state, a frequency resource can be effectively utilized.

With the above arrangement, when a random factor is included in the modulation state selecting unit, there can be reduced a possibility that the modulation states of two radar apparatuses are changed again to the same modulation states.

When the wave interference detecting unit determines the presence of the wave interference with use of the modulation state information of the other radar apparatuses, the modulation state can be previously changed before the wave interference takes place.

Figure 16A:
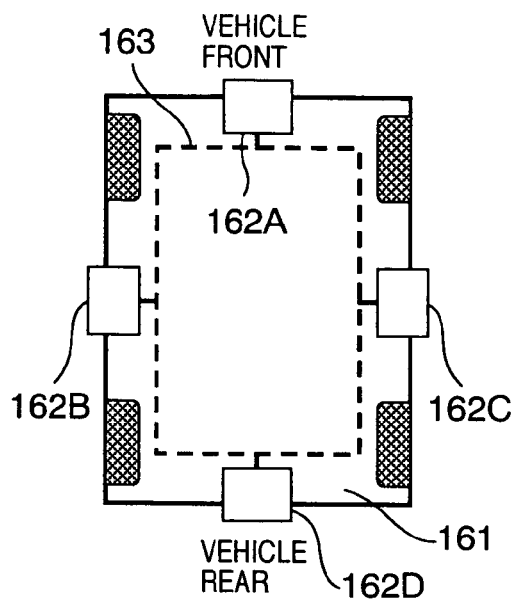
FIGS. 16A, 16B, and 16C show examples of setting priorities of radio wave radar apparatuses.
Figure 16B:
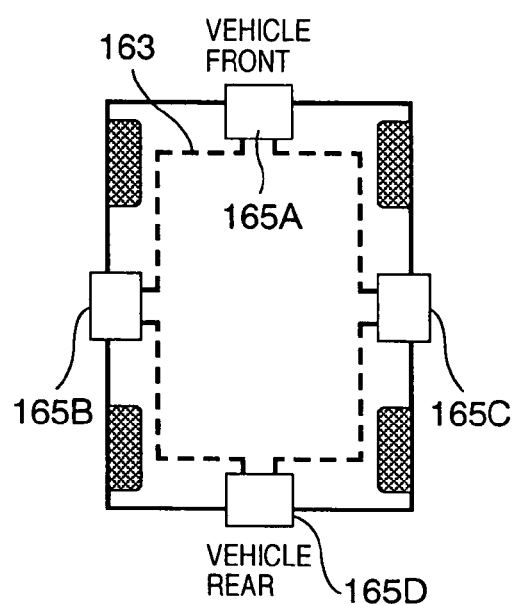
Figure 16C:
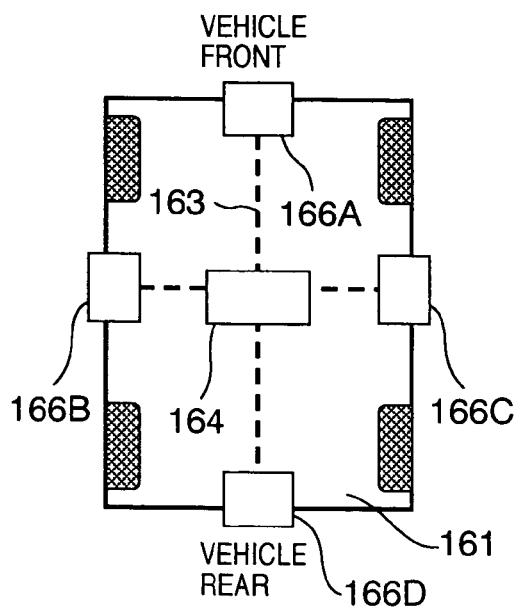

When each radar apparatus comprises an identification unit for identifying the priority of the radar, and when the change of the modulation state is determined according to the identified priority; the functions of the radar apparatuses can be stopped in an increasing order of the priority when the usable modulation states become insufficient. In other words, the detecting operation of the radar apparatus, which emits the wave especially toward the front of the vehicle and is required to have the highest importance from the safety viewpoint, can function until the last. FIGS. 16A, 16B, and 16C show examples of setting priorities for respective radar apparatuses on the basis of the connection pattern of the CAN communication between the radar apparatuses. More specifically, FIG. 16A is when a CAN 163 is of a T type, FIG. 16B is when the CAN 163 is of a n type, and FIG. 16C is when the CAN 163 is of a star type. In the cases of FIGS. 16A and 16B, for example, a radar apparatus 162A (165A) mounted at the front side of a vehicle 161 is set to have the highest priority; and a radar apparatus 162B (165B) mounted at the left side, a radar apparatus 162C (165C) mounted at the right side, and a radar apparatus 162D (165D) mounted at the rear side are set to have priorities decreased in this order.

When modulation states more than those of the other radar apparatuses are allocated to a specific radar (e.g., the radar apparatus 162A (165A) provided at the front side of the vehicle) having a high importance, a possibility of the function of the high priority radar apparatus being stopped can be made lower than a possibility of the functions of the other radar apparatuses being stopped. A frequency when the number of the modulation states becomes insufficient or lack can be reduced, with respect to the radar apparatus which is mounted to emit an electric wave especially toward the front of the vehicle and which requires a high importance from the safety viewpoint.

One or more of the wave interference detecting unit, the communication unit, and the modulation state selecting unit may be provided in a CPU 164 provided outside the radar apparatus. With this arrangement, the modulation state control of the plurality of radar apparatuses can be collectively achieved. When the system is arranged as shown in FIG. 16C, the CPU 164 can modify the priorities of radar apparatuses 166A, 166B, 166C, and 166D according to the circumstances. For example, when the vehicle is moved backwards, the radar apparatus 166D provided at the rear side of the vehicle is changed to have the highest priority, or when the vehicle changes the lane, the radar apparatuses 166B and 166C provided on the right and left sides of the vehicle are changed to have the highest priority.

The radar apparatus comprises a unit for acquiring a usable range of the modulation state, and a limitation is applied to the modulation state selecting unit according to the acquired range. With such an arrangement, the usable modulation state can be limited according to an external command, and thus different modulation states can be allocated, for example, to different vehicle running lanes.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radar apparatus including a plurality of radar devices, the radar apparatus comprising:
    means for transmitting and receiving an electric wave to detect a target via a radar device;
    means for detecting wave interference caused by surroundings from said radar device;
    means for controlling a modulation state of the transmitted wave;
    communication means for acquiring modulation state information being used by other radar devices of the plurality of radar devices; and
    means for selecting such a modulation state as to avoid interference with the modulation state information when the wave interference detecting means detects the wave interference,
    wherein the modulation state selecting means selects the same modulation state for the radar devices having different mounting directions by an angle not less than 90 degrees.

2. A radar system for a vehicle that includes a plurality of radar devices installed on the vehicle,
    each of the radar devices comprising:
        means for transmitting and receiving an electric wave to a target;
        means for detecting wave interference caused by surroundings; and
        means for controlling a modulation state of the transmitted wave from the radar device,
    the system further comprising:
        communication means for acquiring modulation state information being used by other of the plurality of radar devices radar devices; and
        means for selecting such a modulation state as to avoid interference with the modulation state information when the wave interference detecting means detects the wave interference,
        wherein the modulation state selecting means determines whether the modulation state is to be changed or not according to a priority of the radar device, the priority being determined based on the modulation state information acquired by the communication means, and a higher priority is provided to a radar device disposed at a front side of the vehicle.

3. A radar apparatus according to claim 1, wherein the modulation state includes one or more of a carrier frequency, a modulation type, an orientation of polarization plane of the wave, a transmission cycle, and a modulation code.

4. A radar apparatus according to claim 1, wherein the wave interference detecting means processes a received signal of the wave for determination.

5. A radar apparatus according to claim 1, wherein a random factor is included in the modulation state selecting means.

6. A radar apparatus according to claim 1, wherein the wave interference detecting means determines the presence of the wave interference with use of the modulation state information of the other radar apparatuses.

7. A radar system for a vehicle including the radar system set forth in claim 2, comprising:

means, when the usable modulation state becomes insufficient, for stopping functions of the radar devices in an increasing order of the priority.

8. A radar apparatus according to claim 1, wherein one or more of the wave interference detecting means, the communication means, and the modulation state selecting means are provided outside the radar apparatus.

9. A radar apparatus according to claim 1, comprising means for acquiring a usable range of the modulation state, and wherein a limitation is applied to the means for selecting the modulation state according to the acquired range.

* * * * *